350-447 SR 17

E297A XR 3,814,904

United Stat

Russell et al.

[11] 3,814,904

[45] June 4, 1974

[54] CRYPTOGRAPHICALLY CODED CARDS EMPLOYING SYNTHETIC LIGHT MODIFYING PORTION

[75] Inventors: John Patrick Russell, Thalwil; David Leslie Greenaway, Bassersdorf, both of Switzerland

[73] Assignee: RCA Corporation, New York, N.Y.

[22] Filed: Oct. 20, 1972

[21] Appl. No.: 299,294

[52] U.S. Cl...... 235/61.11 E, 235/61.12 N, 250/266

[51] Int. Cl....... G06k 7/10, G06k 19/06, G08c 9/06

[58] Field of Search. 235/61.11 E, 61.12 N, 61.7 B; 340/149 A, 149 R; 250/219, 566, 555, 567

[56] References Cited

UNITED STATES PATENTS

| | | | |
|---|---|---|---|
| 3,533,704 | 10/1970 | Krenmayr | 356/198 |
| 3,611,292 | 10/1971 | Brown et al. | 340/149 R |
| 3,627,991 | 12/1971 | Beall et al. | 235/61.11 E |
| 3,686,480 | 8/1972 | Bowerman | 235/61.12 N |
| 3,706,874 | 12/1972 | Lockard | 235/61.11 E |

*Primary Examiner*—Daryl W. Cook

*Attorney, Agent, or Firm*—George J. Seligsohn; Edward J. Norton

[57] ABSTRACT

A light-modifying portion divided into a plurality of discrete subareas each of which is occupied by an assigned light-modifying form, such as a prism of selected inclination, produces a pattern in accordance with a code of output light beams during decoding which manifests the code. The meridional angle of the form may also be assigned in accordance with the code. Redundancy is optionally obtainable in that the total plurality of subareas may be divided into groups of subareas, each member of one particular group possessing the same selected inclination and meridional angle and by using an imaging lens during decoding to focus ones of the output light beams derived from the total plurality of discrete subareas to a common focus point.

20 Claims, 8 Drawing Figures

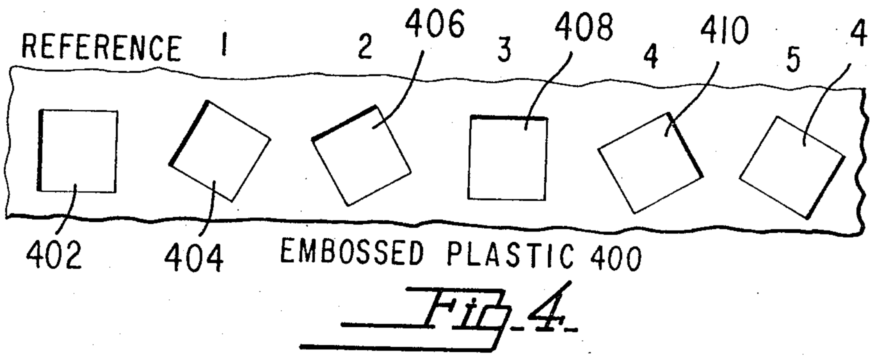
FIG. 4
| | | | | | | |
|---|---|---|---|---|---|---|
| $\theta_1$ R | $\theta_2$ 2 | $\theta_1$ 1 | $\theta_1$ 4 | $\theta_2$ R | $\theta_2$ 2 | $\theta_2$ 5 |
| $\theta_1$ 3 | $\theta_2$ 5 | $\theta_2$ R | $\theta_2$ 5 | $\theta_1$ 1 | $\theta_1$ 3 | $\theta_1$ 4 |
| $\theta_1$ R | $\theta_1$ 1 | $\theta_1$ 3 | $\theta_2$ 2 | $\theta_1$ 4 | $\theta_2$ R | $\theta_2$ 5 |
| $\theta_2$ 2 | $\theta_1$ R | $\theta_1$ 4 | $\theta_2$ R | $\theta_1$ 3 | $\theta_1$ 1 | $\theta_1$ R |
= 12345 BIT POSITION / 10110 BINARY CODE
REDUNDANT BIT POSITION ASSIGNMENT
FIG. 5
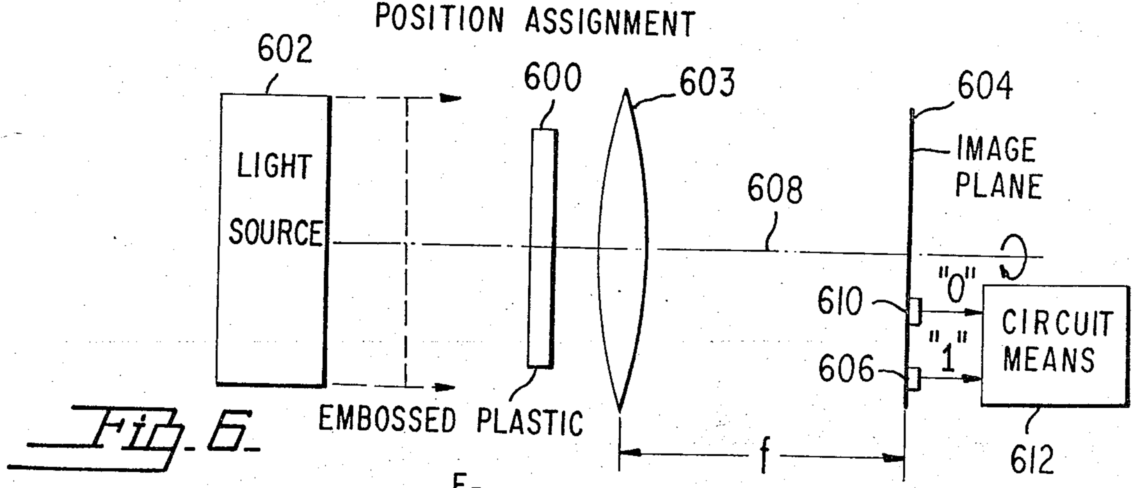
FIG. 6
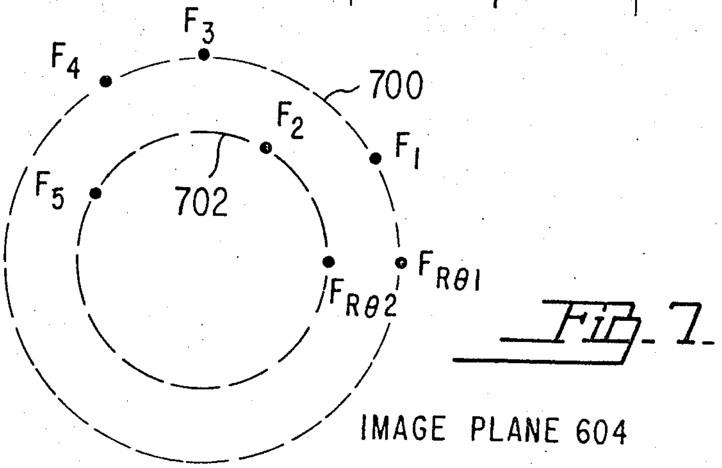
FIG. 7

CRYPTOGRAPHICALLY CODED CARDS EMPLOYING SYNTHETIC LIGHT MODIFYING PORTION

This invention relates to cryptographically coded cards, and more particularly, to cards of the type employing a light-modifying portion responsive to the illumination thereof with a single incident light beam for deriving a particular subset of a given set of output light beams in accordance with a cryptographic code manifested by the light modifying portion of the illuminated card.

Reference is made to our U.S. Pat. No. 3,643,216, issued Feb. 16, 1972, which employs such cryptographically coded cards as identification or credit cards in a holographic identification system. The light-modifying portion of each card employed in the system disclosed in Pat. No. 3,643,216 comprises a unique holographically encoded number which may be decoded by a simple decoder requiring only a single flashlight bulb as a light source for reconstructing an image of the holographic code. This reconstructed image comprises a fixed predetermined pattern of a total number of spaced points, some of which, in accordance with the coded number, are manifested by light spots while the rest of the points are manifested by dark spots.

The light-modifying portion of the cryptographically coded card of the present invention also contains an encoded number which may be decoded by a simple decoder requiring only a single flashlight bulb as a light source. However, the light-modifying portion of a coded card of the present invention is not a hologram, as in the system disclosed in Pat. No. 3,643,216. Instead, the light-modifying portion of the card of the present invention is synthetic, being made up of a plurality of discrete subareas, each of which is substantially parallel to a given plane and each of which is occupied by an assigned one of a group of different predetermined light-modifying forms. Each separate subarea is responsive to the illumination thereof by light for deriving an output light beam at that one of a unique plurality of discrete inclination angles with the normal to the given plane determined by the assigned form occupying that subarea. By way of example, the light-modifying forms may be prisms or, alternatively, diffraction gratings. In those cases where the group of forms are circularly assymetrical about the normal to the given plane, the particular form occupying any respective one of the subareas may be oriented at an assigned one of a second group of predetermined meridional angles about the normal to the given plane.

These and other features and advantages of the present invention will become more apparent from the following detailed description, taken together with the accompanying drawings in which:

FIG. 4 illustrates a sheet of plastic having various prisms embossed on respective subareas thereof, wherein each of the prisms is oriented at a different meridional angle;

FIG. 5 illustrates an example of a redundant bit position assignment for a light-modifying portion containing a given multibit binary code;

FIG. 6 illustrates an example of the type of decoder which may be employed for decoding the cryptographic cards of the present invention;

FIG. 7 illustrates an example of the distribution of light spots obtained in the image plane of FIG. 6, and FIG. 8 diagrammatically illustrates a certain physical arrangement that the light-modifying portion of a cryptographic card may take.

Figure 1:
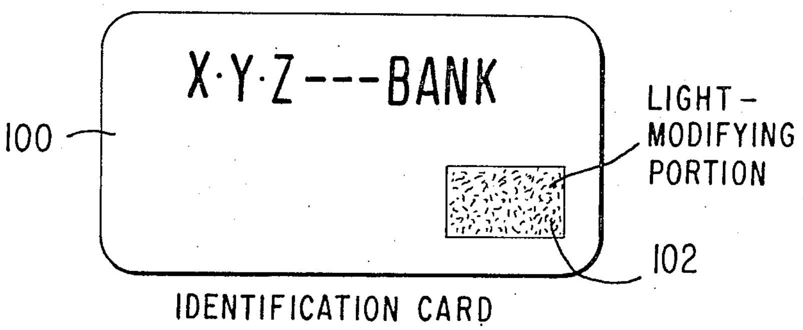
FIG. 1 illustrates a sample of a typical credit or identification card incorporating a light-modifying portion.

Referring now to FIG. 1, identification card 100 may be similar to conventional identification or credit cards in size, in shape, and in including certain printed matter thereon, such as "XYZ Bank", for instance. However, identification card 100 differs from a conventional identification or credit card in that it includes as an integral part thereof at some predetermined position on the card, such as near the lower right end of the card for example, a light-modifying portion 102 which contains information in cryptographic form manifesting a number associated with that particular identification card. Of course, different cards may have different numbers associated therewith. Except for the fact that light-modifying portion 102 is not a hologram, the identification card of FIG. 1 is essentially similar to the identification card shown in the aforesaid Pat. No. 3,643,216.

Light-modifying portion 102 of identification card in FIG. 1 is made of a material, such as plastic, which is capable of having predetermined light-modifying forms embossed on a surface thereof. In particular, the area of light-modifying portion 102 includes a large number of discrete subareas, each of which has an individual assigned predetermined light-modifying form embossed thereon. Although not limited thereto, for illustrative purposes it will be assumed that the light-modifying forms comprise prisms. Preferably, the dimensions of each subarea and the prism occupying that subarea should be small to permit a large total number of prisms in the overall area of light-modifying portion 102, but not so small as to appreciably diffract incident light. More specifically, subarea and prism dimensions within a range extending from a minimum of about 10 microns to a maximum of about 100 microns is considered preferable.

Figure 2:
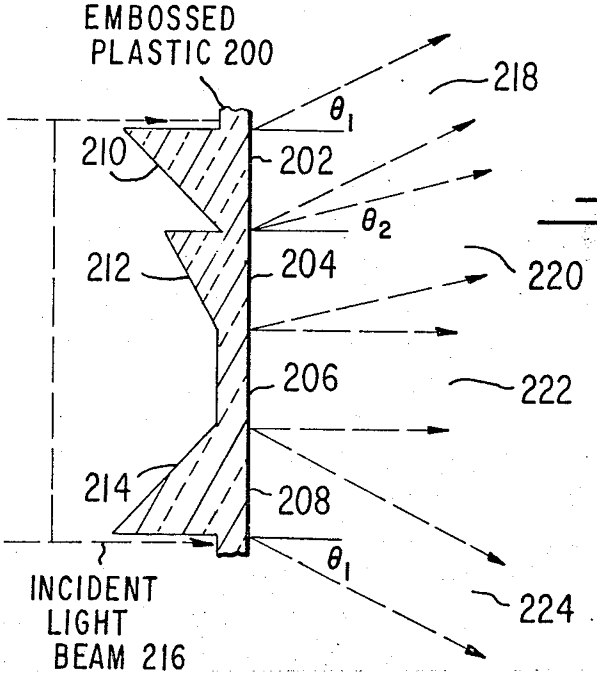
FIG. 2 shows the effect of refraction by various prisms of different inclinations embossed on respective subareas of a plastic sheet on a single incident light beam.

Referring now to FIG. 2, there is shown the refractive effect on an incident light beam of prisms of different inclination embossed on plastic 200. Plastic 200 includes four contiguous subareas 202, 204, 206 and 208. Subarea 202 has prism 210 embossed thereon, subarea 204 has prism 212 embossed thereon, subarea 206 has no prism embossed thereon and subarea 208 has prism 214 embossed thereon. Prism 210 has a given positive angle of inclination; prism 212 has a positive angle of inclination which is smaller than the given angle of inclination of prism 210, and prism 214 has a negative angle of inclination which is equal in absolute value to the given angle of inclination of prism 210. In response to incident light beam 216, which is directed normal to the given plane of subarea 202, 204, 206 and 208, respective output light beams 218, 220, 222 and 224 are derived. Output light beam 218, which is derived by prism 210, is inclined at a positive angle $\theta_1$ with respect to the normal to the given plane of the subareas; output light beam 220, derived by prism 212, is inclined at positive angle $\theta_2$, smaller than $\theta_1$, with respect to the normal to the given plane; output beam 222, derived by subarea 206 in which a prism is absent, remains unrefracted and, like incident light beam 216, is normal to the given plane and output beam 224, which is derived by prism 214, is inclined at a negative angle $\theta_1$, equal in absolute value to the inclination of output beam 218, with respect to the given plane. Thus, the direction of each output beam emerging from each respective subarea of embossed plastic 200, which has a given index of refraction, is determined by the angle of inclination of the embossed prism occupying that subarea. The purpose of FIG. 2 is to illustrate this principle employed by the present invention.

Figure 3:
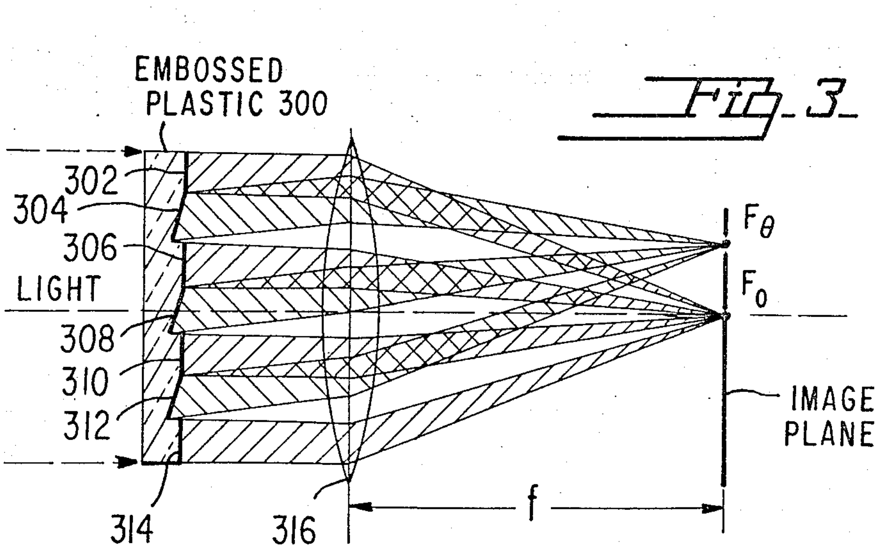
FIG. 3 illustrates the cooperative combination of an embossed plastic and a lens to provide redundant image spots of light in the image plane of the lens in response to the illumination of the plastic by an incident beam of light.

Reference is now made to FIG. 3 which shows embossed plastic 300 comprising subareas 302, 304, 306, 308, 310 312 and 314. All of subareas 302, 306, 310 and 314 have the same first angle of inclination (which happens to be zero) with respect to the normal of the subareas, while each of subareas 304, 308 and 312 have the same second angle of inclination (which happens to be other than zero) with respect to the normal to the subareas. If embossed plastic 300 is illuminated with a beam of incident light (which in the case of FIG. 3 happens to be a parallel beam having a plane wavefront) separate output beams will be derived from each of the respective subareas. Since the angle of inclination of the subareas 302, 306, 310 and 314 are all the same as each other, the angle of inclination of all the output beams derived from this group of subareas will also be the same as each other. Similarly, the angle of inclination of the output beams derived from subareas 304, 308 and 312 will be the same as each other, but will have a different value from that of the angle of inclination derived from the group of subareas 302, 306, 310 and 314.

As shown in FIG. 3, an imaging lens 316 (having a focal length *f*) placed in the path of the output beams from embossed plastic 300 focuses all of those output beams derived from subareas 302, 306, 310 and 314 having a first angle of inclination to a first common point $F_0$ in an image plane of lens 316 (which under the assumed condition happens to be the focal point of lens 316 in its focal plane) and focuses the output beams derived from subarea 304, 303 and 312 which have a second angle of inclination to a second common point F $\theta$ in the image plane of lens 316. Thus by assigning the same angle of inclination to a plurality of different subareas of plastic 300, redundancy can be achieved by employing an image lens, FIG. 3 illustrates a second principle which may be employed in the present invention.

The operation of the principle shown in FIG. 3 is not restricted to the case where lens 316 lies between embossed plastic 300 and the image plane. The embossed plastic may be located in a converging beam of light which focuses at the image plane; under these circumstances lens 316 is used to produce a convergent beam of light which subsequently passes through the embossed plastic 300.

It will be noted that in each of FIGS. 2 and 3 all the respective output beams lie in the plane of the paper. This is because all of the prisms of FIGS. 2 and 3 have the same orientation in the plane of the paper. However, the shape of each of the prisms, such as prisms 210, 212 and 214 of FIG. 2 or prisms 304, 308 and 312 of FIG. 3, is assymetrical about the normal to the given plane occupied by the subareas of embossed plastic 200 or embossed plastic 300, and thus possesses a discrete angular orientation. It is therefore possible to orient a prism at any meridional angle in a plane parallel to this given plane (a plane normal to the plane of the paper in each of FIGS. 2 and 3). In particular, FIG. 4 shows a plan view of embossed plastic 400, which has respective prisms 402, 404, 406, 408, 410 and 412 embossed therein, each at a different meridional angle in a set of discrete angular orientations. For illustrative purposes, it is assumed that the meridional angle of prism 402 is zero and that the respective meridional angles of the other prisms 404, 406, 408, 410 and 412 are 30°, 60°, 90°, 120° and 150° respectively. If embossed plastic 400 is illuminated with a beam of incident light, the meridional angle about the normal to plastic 400 of the output light beam derived by any one of the prisms 402, 404, 406, 408, 410 and 412 will be determined by the meridional angle orientation of that one prism. This is a third principle which may be employed in the present invention.

It will be seen that the angle of inclination and the meridional angle of any output light beam are independent variables determined respectively by the angle of inclination and the meridional angle of the light-modifying form, such as a prism by which the output light beam was derived. Therefore, by occupying each of a plurality of the discrete subareas by an assigned one of a group of prisms having different angles of inclination and preferably orientating the particular prism occupying any respective one of the subareas at an assigned one of a second group of predetermined meridional angles, the assignments manifesting in coded form certain information such as a number, a light-modifying portion of a cryptographically coded card is provided. Furthermore, the assignments may redundantly manifest the certain information, such as the coded number.

By way of example, FIG. 5 illustrates the redundant bit position assignment for the particular five-bit binary coded number 10110. FIG. 5 is meant to be merely illustrative, and in no way limiting. For instance, FIG. 5 shows only 28 discrete subareas, all of which are regularly shaped. In practice, the number of discrete subareas is normally much greater and their respective shapes need not be regular. Furthermore, while the particular coding scheme employed in FIG. 5 derives output light beams arranged in a format which is particularly suitable for use in an identification system and forms the subject matter of copending patent application Ser. No. 299,295 filed on even data herewith, the particular coding scheme employed in FIG. 5 is optional.

In the coding scheme employed in FIG. 5, a binary ONE is manifested by a prism having a first predetermined angle of inclination $\theta_1$ and a binary ZERO is manifested by a prism having a different angle of inclination $\theta_2$. A prism oriented at the meridional angle of prism 404 manifests the bit occupying the first bit position. In a similar manner, prisms oriented respectively at the meridional angle occupied by prisms 406, 408, 410 and 412 manifest bits occupying respectively the second, third, fourth and fifth bit positions of the binary code. In addition, a meridional angle reference is provided by prisms oriented at the meridional angle of prism 402. The redundant bit position assignment shown in FIG. 5 provides a redundancy of four.

Since the value of the first bit of the binary code illustrated in FIG. 5 is ONE, any four randomly chosen discrete subareas are assigned prisms having the angle of inclination $\theta_1$ which are oriented at the meridional angle of prism 404. Since the binary value of the second bit position is ZERO, four other randomly chosen subareas are assigned prisms having an angle of inclination $\theta_2$ which are oriented at the meridional angle of prism 406. In a similar manner, each of the third, fourth and fifth bit positions are assigned four subareas apiece which are occupied by prisms at the appropriate angle of inclination and orientation, as indicated in FIG. 5. This leaves eight additional subareas unoccupied by prisms manifesting respective bit positions. Any four of these eight additional subareas are occupied by prisms having an angle of inclination $\theta_1$ which are oriented at the meridional angle of prism 402 and the remaining four of which are occupied by prisms having an angle of inclination $\theta_2$ which are also oriented at the meridional angle of prism 402, as indicated in FIG. 5.

FIGS. 6 and 7 are directed to the decoding of a light-modifying portion of a cryptographic card which incorporates the redundant bit position assignment as shown in FIG. 5. The light-modifying portion on embossed plastic 600 is illuminated with incident light from light source 602. Emerging output light beams derived by the light-modifying portion of embossed plastic 600 are incident on lens 602 and are focused thereby into a pattern of spots in image plane 604. A first light sensor 606 is located in image plane 604 at a first distance from optic axis 608 which is related to the angle of inclination $\theta_1$. Second light sensor 610 is located in coincidence with image plane 604 at a second distance from optic axis 608 which is related to the angle of inclination $\theta_2$.

Reference is made to FIG. 7, which shows the relative position of the pattern of focused light spots in image plane 604. In particular, all subareas of FIG. 5 which are occupied by prisms having both the same angle of inclination and the same meridional angle will derive output light beams which are focused by lens 602 to the same spot in image plane 604, for the reasons discussed in detail with connection to FIG. 3. All subareas of FIG. 5 which are occupied by prisms having the same angle of inclination but different meridional angles will derive light beams which are focused to different points in image plane 604 lying on the circumference of a circle about optic axis 608 having a radius determined by the angle of inclination of these prisms. Therefore, prisms having the angle of inclination $\theta_1$ will derive light spots lying on the circumference of outer circle 700 and prisms having an angle of inclination $\theta_2$ will derive light spots lying on the circumference of inner circle 702 (assuming that inclination angle $\theta_1$ is larger than $\theta_2$). Further, the relative meridional angle of the light spots on either circle 700 or circle 702 corresponds with the meridional angle of the particular prisms which derive the output light beams focused by lens 602 into that light spot.

Based on these criteria, light spots $F_{R\,\theta\,1}$, derived from those subareas designed $\theta_1^R$ in FIG. 5, will occupy a point on the circumference of circle 700. Light spots $F_{R\,\theta\,2}$ derived by those subareas designated $\theta_1^R$ in FIG. 5, will occupy a point on circle 702 having the same meridional angle as point $F_{R\,\theta\,1}$. Further, the relative meridional angles of light spots $F_1$, $F_2$, $F_3$, $F_4$ and $F_5$, corresponding to the respective bit positions of the binary code, with respect to the meridional position of light spots $F_{R\,\theta\,1}$ and $F_{R\,\theta\,2}$ are indicative of the appropriate bit positions. Similarly the location of light spots $F_1$, $F_3$ and $F_4$ on the circumference of outer circle 700 is indicative that the binary value of the first, third and fourth bit positions of the binary code manifested by embossed plastic 600 are all ONE and the location of light spots $F_2$ and $F_5$ on the circumference of inner circle 702 is indicative that the binary value of second and fifth bit positions of this binary code are ZERO.

Returning to FIG. 6, the first distance from optic axis 608 at which light sensor 606 is situated is equal to the radius of outer circle 700 and the second distance from optic axis 608 at which light sensor 610 is situated is equal to the radius of inner circle 702. As indicated by the circular arrow about optic axis 608, the pattern in image plane 604 is rotated with respect to light sensors 606 and 610 by any suitable means, not shown therein. Such pattern-rotating means, which are fully disclosed in said copending patent application Ser. No. 299,295, may include means for rotating embossed plastic 600 with respect to light sensors 606 and 610, means for rotating light sensors 606 and 610 with respect to the embossed plastic 600 or, rotating optical means, such as a Dove prism, situated intermediate between lens 602 and image plane 604. In any case, the light spots situated on the circumference on outer circle 700 sequentially pass and are detected by light sensor 606 and the light spots situated on the circumference of inner circle 702 sequentially pass and are detected by light sensor 610. The signals detected by light sensor 606 and 610 are applied as inputs to circuit means 612, which may include a coincidence circuit to producing a start signal in response to the simultaneous presence of light spots $F_{R\,\theta\,1}$ and $R_{R\,\theta\,2}$ as well as means responsive to the start signal and the other signals detected respectively by light sensor 606 and light sensor 610 for obtaining the binary code 10110 manifested by the pattern of light spots in image plane 604. Circuit means 612 may also include appropriate means for utilizing the detected binary code once obtained, as in the case of the holographic identification system disclosed in the aforesaid U.S. Pat. No. 3,643,216.

Figure 8:
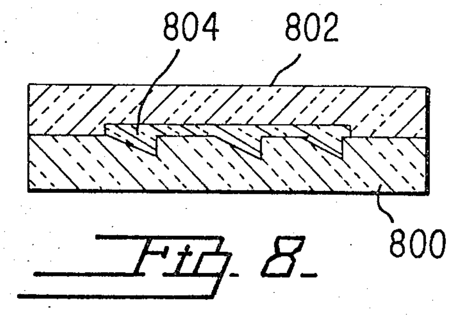

Referring now to FIG. 8 there is shown in physical form that light-modifying portion 102 may take. In particular, FIG. 8 includes an embossed first element 800 having a given refractive index and a cover element 802 having substantially the same refractive index. The region 804 enclosed by elements 800 and 802 is filled with a medium having an index of refraction different from elements 800 and 802. Region 804 may be filled with a solid material, a liquid material or a gaseous material, such as air, or may even be a vacuum. The benefit of the particular structure of a light-modifying portion shown in FIG. 8 is that the enclosed embossed portion is protected from the deleterious effects of being exposed to the surrounding environment.

For illustrative purposes, the light-modifying forms employed in the present invention have been assumed to be prisms. However, this is not essential. For instance, the light-modifying form occupying each subarea could be any type of optical element capable of deriving an output light beam at an assigned angle of inclination with respect to the normal of the subarea and, preferably, oriented at a meridional angle determined by the orientation of the light-modifying form. In addition to a prism a diffraction grating could be employed, by way of example. In the case of a diffraction grating, the angle of inclination of the derived output light beam is determined by the line spacing frequency thereof and the meridional angle is determined by the orientation of the lines thereof. Due to the fact that the diffraction grating derives a plurality of diffraction order components, it may be necessary to employ appropriate filtering means in the decoder to eliminate unwanted diffraction means.

What is claimed is:

1. In a cryptographically coded card of the type employing a light-modifying portion responsive to the illumination thereof with a single incident light beam for deriving a particular subset of a given set of output light beams in accordance with a cryptographic code manifested by said light-modifying portion of the illuminated card; the improvement wherein said light-modifying portion includes a plurality of discrete subareas parallel to a given plane each of which is occupied by an assigned one of a group of different predetermined light-modifying forms, each separate subarea being responsive to the illumination thereof by light for deriving an output light beam at that one of a unique plurality of discrete inclination angles with the normal to said given plane determined by the assigned form occupying that subarea.

2. The cryptographically coded card defined in claim 1, wherein each of said group of forms is shaped to possess some one of a set of discrete angular orientations about said normal, and wherein the particular form occupying any respective one of said subareas is oriented at an assigned one of a second group of predetermined meridional angles about said normal.

3. The cryptographically coded card defined in claim 2, wherein more than one subarea is assigned both the same form from said first-mentioned group and the same meridional angle from said second group.

4. The cryptographically coded card defined in claim 3, wherein said plurality of subareas is equal in number to the product of first and second plural integers, and any given one of said forms at any given one of said meridional angles is assigned to a number of said subareas equal to said first integer, whereby the total number of assignments differing either in form or meridional angle is equal to said second integer.

5. The cryptographically coded card defined in claim 4, wherein the relative positions of said assigned subareas with respect to each other is randomly distributed in said plane.

6. The cryptographically coded card defined in claim 2, wherein said cryptographic code is a binary code having a given number of bit positions, wherein said first group of different forms includes a first predetermined form manifesting a binary ONE and a second predetermined form manifesting a binary ZERO, and wherein said second group of different meridional angles includes a separate predetermined meridional angle manifesting each different bit position of said crytographic code.

7. The cryptographically coded card defined in claim 1, wherein said light-modifying portion comprises a transparent material having a different index of refraction from its surroundings, said material including two opposed surfaces thereof one of which has said group of forms embossed thereon and the other of which lies in a plane substantially parallel to said given plane.

8. The cryptographically coded card defined in claim 7, wherein each of said different forms comprises a portion of said one surface inclined at a different predetermined angle with respect to said normal, whereby each of said different forms defines a prism having a different respective angle of inclination and each of said subareas is occupied by an assigned one of said prisms.

9. The cryptographically coded card defined in claim 8, wherein all of said group of prisms are circularly assymetrical about said normal, and wherein the particular prism embossed on any respective one of said subareas occupies an assigned one of a second group of predetermined meridional angles about said normal.

10. The cryptographically coded card defined in claim 9, wherein more than one subarea is assigned both the same prism from said first-mentioned group and the same meridional angle from said second group.

11. The cryptographically coded card defined in claim 10, wherein said plurality of subareas is equal in number to the product of first and second plural integers, and any given one of said prisms at any given one of said meridional angles is assigned to a number of said subareas equal to said first integer, whereby the total number of assignments differing either in prism or meridional angle is equal to said second integer.

12. The cryptographically coded card defined in claim 11, wherein the relative positions of said assigned subareas with respect to each other is randomly distributed in said plane.

13. The cryptographically coded card defined in claim 12, wherein said cryptographic code is a binary code having a given number of bit positions wherein said first group of different prisms includes a first predetermined prism manifesting a binary ONE and a second predetermined prism manifesting a binary ZERO, and wherein said second group of different meridional angles includes a separate predetermined meridional angle manifesting each different bit position of said cryptographic code.

14. The cryptrographically coded card defined in claim 7, wherein said material encloses a region having a different index of refraction therefrom, said one surface of said material being situated at an interface between said material and said region.

15. A decoder for decoding cryptographically coded cards:

a. wherein each card comprises a light-modifying portion which includes a given plurality of discrete subareas parallel to a given plane each of which is occupied by an assigned one of a first group of different predetermined light-modifying forms shaped to possess some one of a set of discrete angular orientations, each form being oriented at an assigned one of a second group of different meridional angles about the normal to that subarea said assignments being made in accordance the code of that card, each separate subarea being responsive to the illumination thereof with light for deriving an output light beam at that one of a plurality of discrete inclination angles with said normal determined by the assigned form occupying that subarea and at that one of a plurality of discrete meridional angles about said normal determined by the assigned orientation of the assigned form occupying that subarea, and wherein more than one subarea is assigned both the same form from said first group and the same meridional angle from said second group; and b. wherein said decoder comprises a light source illuminating the light-modifying portion of a cryptographically coded card to be decoded for deriving respective output light beams from each of said subareas which have respective angles of inclination with said normal and respective meridional angles about said normal determined by both the assigned form and assigned orientation thereof occupying the subarea from which each of said respective output beams is derived, imaging means situated in predetermined spaced relationship with respect to said card to be decoded and illuminated by all of said respective output beams for focusing those output beams which have both the same inclination angle and the same meridional angle as each other to the same focal point and for focusing those output beams which have different inclination angles and/or different meridional angles to different given focal points so that the card then being illuminated is represented by the spatial distribution of said focal points, and means including light sensors responsive to the spatial distribution of said focal points for ascertaining of the card then being illuminated.

16. The decoder defined in claim 15, wherein said imaging means is a convex lens having a given focal length and having its focal plane oriented substantially parallel to said given plane, and wherein the direction of the light from said light source incident on said subareas is at least paraxial with respect to said normal thereto, whereby said focal points all lie in an image plane of said lens.

17. The decoder defined in claim 16, wherein said incident light has a plane wavefront; whereby said image plane is the focal plane of said lens.

18. The decoder defined in claim 16, wherein said plurality of subareas is equal in number to the product of first and second plural integers, and any given one of said forms at any given one of said meridional angles is assigned to a number of said subareas equal to said first integer, whereby the total number of assignments differing either in form or meridional angle and the total number of different focal points is equal to said second integer.

19. The decoder defined in claim 18, wherein sadi cryptographic code is a binary code having a given number of bit positions, wherein said first group of different forms includes a first predetermined form manifesting a binary ONE and a second predetermined form manifesting a binary ZERO, and wherein said second group of different meridional angles includes a separate predetermined meridional angle manifesting each different bit position of said cryptographic code, whereby each bit position is represented by a separate focal point in said image plane with all of those focal points representing bits manifesting a binary ONE lying on the circumference of a first-radius circle and all those focal points representing bits manifesting a binary ZERO lying on a second-radius circle.

20. The decoder defined in claim 15, wherein said plurality of subareas is equal in number to the product of first and second plural integers, and any given one of said forms at any given one of said meridional angles is assigned to a number of said subareas equal to said first integer, whereby the total number of assignments differing either in form or meridional angle and the total number of different focal points is equal to said second integer.

* * * * *